July 3, 1962 W. S. LEVINE 3,041,870
WATER DETECTION IN HYDROCARBON FUELS
Filed March 26, 1958
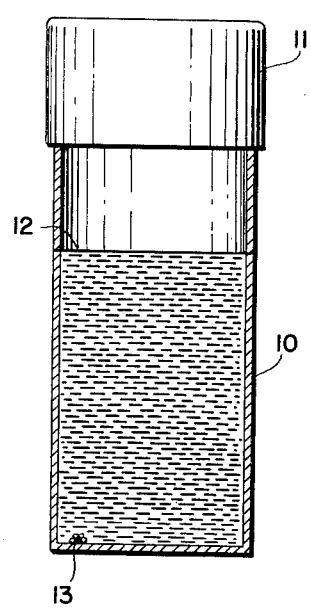
FIG.1
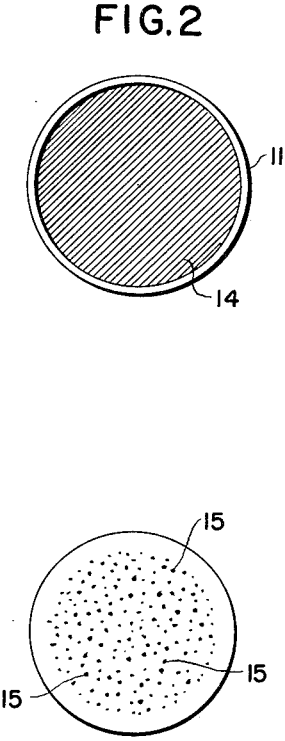
FIG.2
FIG.3
INVENTOR.
William S. Levine
BY
*Charles A. Huggett*
ATTORNEY 3,041,870
WATER DETECTION IN HYDROCARBON FUELS
William S. Levine, Floral Park, N.Y., assignor to Socony
Mobil Oil Company, Inc., a corporation of New York
Filed Mar. 26, 1958, Ser. No. 724,032
4 Claims. (Cl. 73—53)

This invention relates to a method and apparatus for detecting the presence of small amounts of water suspended in distillate fuels such as aviation and motor fuels derived from petroleum oils.

The presence of water in fuels for internal combustion engines has been recognized over the years as being undesirable. Efforts have been made by fuel manufacturers to maintain the water content of the fuel at a low level and similarly engine designers have endeavored to keep moisture from entering the engine combustion system with the fuel. For the most part, these efforts have been reasonably successful in the past in keeping the water content of the fuel at a level low enough to prevent malfunctioning of the engines from water contamination.

Recent improvements in engine design have unfortunately resulted in making the engine more sensitive to the presence of water in the fuel and have consequently made it more essential that fuels with very low water concentration be supplied to the engine. This is especially true in the case of aircraft engines and particularly the new jet and turbine engines now being supplied to commercial airlines in large numbers. The military services of the world have faced this problem for some time now and have endeavored to meet the problem in part by specifying stringent requirements for the fuels supplied to them. For instance, typical jet fuels are defined in Military Specification MIL–F–5624B. For example, such fuels can have: an initial boiling point of 250° F., a ten (10) percent evaporation at 410° F., fifty (50) percent at 425° F., ninety (90) percent at 500° F., and end point of 572° F. In general, jet fuels contain hydrocarbons boiling in the gasoline and fuel oil ranges, with the major proportion being in the latter range. The fuel must not have a suspended water content in excess of 200 parts per million, in recognition of the detrimental effect that water has upon these modern aircraft engines, particularly at high altitude where the air temperature is exceedingly cold.

There has been a continuous effort over the years to develop a suitable test procedure and apparatus for readily detecting with precision the presence of undesirable amounts of water in fuels, but these efforts have been largely unsuccessful and the results unreliable. The most accepted procedure for determining water content in a fuel involves a laboratory analysis in which a so-called Karl Fischer reagent is reacted with a sample of the fuel, the water content being determined by titration. The active substances of the reagent are sulfur dioxide and free iodine, which are dissolved in a mixture of methanol and pyridine. When reacted with water, the sulfur dioxide and iodine react with the water in a definite ratio, forming iodide and sulphate. The Karl Fischer procedure is far too complicated for field testing, requiring rather cumbersome apparatus.

A variety of techniques have been described in the patent literature for measuring water content in various fluids, but all have been found unsatisfactory for measuring with a desired accuracy of about 50 parts per million the presence of water in a distillate fuel. For instance, Patent Number 1,858,409 discloses heating a sample of fluid at constant temperature in a closed chamber and the determination of the partial pressure of water vapor as an indication of water content. In Patent Number 1,976,752 is disclosed the mixing of calcium carbide with a test sample so that the pressure rise as a result of the reaction of water with the calcium carbide could be used as a measure of water content. In Patent Number 2,734,377 a hydrocarbon liquid is passed through a filter paper and the change in electrical characteristics produced by the presence of water on the paper is used to indicate water content. A somewhat similar arrangement is shown in Patent Number 2,767,574. Patent Number 2,761,312 shows adding cobaltous bromide to a filter paper which is then dipped in the test fuel to determine the presence of water by color change which occurs when anhydrous cobaltous bromide absorbs moisture. The techniques enumerated above as well as others which were tested all fail to provide a sufficiently sensitive test for detecting with repeated accuracy and yet with simplified apparatus the presence of about 40±10 parts per million water suspended in distillate fuel.

I have discovered that this problem can be solved by using a measured test sample of the fuel and incorporating in the fuel a measured amount of water-soluble dye and oil-soluble wetting agent, so that the dye readily contacts the water in the test sample when the sample is vigorously agitated. A filter paper is incorporated in the sample, having been previously contacted by a water-soluble wetting agent so that the paper contacts the fuel sample during agitation. If the sample contains in excess of a critical amount of water, colored dots appear on the paper, and the fuel is determined unsafe for use.

FIGURE 1 represents a test sample prepared for test.
FIGURE 2 represents a test paper in position for test.
FIGURE 3 represents a test paper after test indicating excessive moisture content in the fuel.

The invention will now be disclosed in detail in conjunction with the figure. Having determined that a fuel having about 40 parts per million suspended water (tolerance of ±10 p.p.m.) would be satisfactory under all expected circumstances, this water concentration was accepted as the desired boundary point. Hence, unless the test showed consistently a positive reading above 40 p.p.m. and a negative reading below 40 p.p.m. (tolerance ±10 p.p.m.) it was not considered acceptable for this purpose and was discarded. Cobaltous chloride was tested as an indicating chemical since the dry chloride picks up water, changing from a blue to pink color. While this material gave some indication of water content, it was not found sufficiently accurate and was, therefore rejected.

I found that the best results could be obtained by using a combination of wetting agents and water-soluble dyes. Referring to FIGURE 1, detail 10 shows a glass vial particularly suited for test purposes, having a standard screw cap 11. It was desired to have the apparatus as simple as possible to permit tests in the field with uncomplicated apparatus but with a high degree of reproducibility of test results. I found that for this purpose a two-ounce via was the smallest that could be used with reasonable accuracy of results. The vial 10 is provided with a mark 12 on its outer surface and is filled to that level with the test fuel. I found that a 35 milliliter sample of fuel was the smallest that could be used with adequate reproducibility and that this amount of fuel could be adequately located in a two-ounce vial. In the bottom of the vial is located a small amount of a water soluble dye in crystalline form, detail 13. About 3 milligrams of the dye was found to be satisfactory. While a larger amount of dye could have been used, of course, the amount used was limited to the smallest amount giving satisfactory test results. Of the water-soluble dyes tested, gentian violet (crystal violet; the hexamethyl derivative of pararosaniline), obtainable from the Fisher Scienfiic Company, New York, New York, under their catalog number NA–560, is preferred. Other water-soluble dyes which were tested and found satisfactroy, although not as satisfactory as crystal violet, were as follows: 3,9 bis(dimethylaminophenazothionium) chloride (methylene blue), resorcinolphthalein (fluorescein) and malachite green. I found that a drop of a solution containing an oil-soluble wetting agent was essential to the operation of the test and particularly was essential to the reproducibility of the test within the required range of sensitivity. As the wetting agent for this purpose I prefer sodium naphthenate solution, prepared by dissolving 2.5±0.1 g. of sodium naphthenate in 25 ml. of dry fuel. The sodium naphthenate may be obtained from Nuodex Products Company, Elizabeth, New Jersey, designated as Nuodex Compound X-694. One drop of this solution is mixed with the test fuel sample in the vial. Naturally, a larger amount of the wetting agent can be used but is not required. Other anionic surfactants such as mineral oil sulfonates may be used instead of sodium naphthenate, but the test results are not as sensitive.

FIGURE 2 shows a view of the cap used during test of the fuel. Within the cap 11 is located a disc filter paper 14 adapted to fit snugly within the cap. This paper has been previously treated with a water-soluble wetting agent. A suitable agent for this purpose is an alkylaryl polyether alcohol manufactured by Rohm & Haas Chemical Company, Philadelphia, Pennsylvania, and now sold by them as Triton X-45 wetting agent. Other nonionic surfactants such as Triton X-100 or polyethylene glycol 200 monooleate will work as well as the Triton X-45. While any filter paper is suitable for the purpose, I have found that Whatman filter discs, No. 4, made by W. and R. Balston, Ltd., England, are adequate. They may be obtained from most chemical supply firms. These filter papers are circular and have a diameter of one inch, so that they fit snugly in the two-ounce vial cap. In preparing the filter paper I dissolve 5 g. of the Triton X-45 wetting agent in 100 ml. of distilled water. The papers are then saturated in this solution and dried in an oven at 210° F. for at least three hours. The dried discs are fed into vial caps and kept in closed vials until used. When the fuel sample and the sodium naphthenate are placed in the test vial with the methyl violet crystals, the cap is secured to the vial and the vial shaken violently to bring the liquid in contact with the filter paper. It has been found that, if the concentration of suspended water in the fuel is in excess of 40 parts per million±10 parts per million, a very definite indication in the form of purple dots appears on the filter paper. The paper used may, of course, vary to a considerable extent. A white, unsized paper is found to be most useful for this purpose because it is most absorbent and hence readily picks up the small amount of water in the fuel. Colored papers could be used but would not show the results as clearly as white paper.

FIGURE 3 shows the general appearance of the filter paper if a positive result is obtained. While the number of dots increases with increasing water content and the intensity of the color is deeper with additional water content, the dots 15 and general appearance of the dots as indicated on FIGURE 3 is that obtained when the test first becomes positive, for example, within the range of about 30 to 50 parts per million of suspended water in the fuel.

Water is only very slightly soluble in the distillate fuels disclosed in this application. For example, a jet fuel meeting the jet JP-4 fuel specifications was found to have a maximum water solubility at 70° F. of about 25 parts per million. While the solubility of water in the fuel varies to some extent with the temperature and with the chemical structure of the components of the fuel, for typical fuels at a temperature of about 70° F. the maximum water solubility will not vary to any substantial extent from the 25 parts per million value given above. Whenever the fuel has suspended water, it of course is fully saturated, having approximately 25-50 parts per million of water dissolved therein. While this test is only designed to indicate a fixed value of suspended water, since the critical limit of suspended water has been set at such a low value, the presence of the dissolved water will not be objectionable. The military specifications for jet fuels limit the amount of dissolved water at 200 parts per million and also limit the amount of suspended water at 200 parts per million. However, as long as the amount of suspended water in the fuel is kept below such a low value as 50 parts per million, the total water content of suspended and dissolved water will not nearly approach the limits indicated above.

TEST NO. 1

As a test of the reproducibility of this procedure a JP-4 fuel was selected for test purposes and steam was passed through the fuel to obtain a suspension of water in the fuel sample. The sample was allowed to stand and at different intervals portions of the sample were taken and tested both by the Karl Fischer technique and by the test procedure described hereinabove. The suspended water in the fuel gradually settles out with time and, therefore, as the test was continued, the fuel samples contained less and less suspended water. The test was continued until the test was barely positive showing the blue dots as indicated in FIGURE 3.

Each sample of fuel, in addition to being tested in the test apparatus described hereinabove, was also tested first by the Karl Fischer procedure to indicate the total water content in the test fuel, and then was re-tested by the Karl Fischer procedure after being centrifuged to effect removal of the dissolved water. The difference between the two results obtained by the Karl Fischer technique gave the actual amount of suspended water in the fuel. The results of these tests are shown in the following table:

*Table 1*

| Run Number | 1 | 2 | 3 | 4 | 5 | 6 | 7 | 8 | 9 | 10 |
|---|---|---|---|---|---|---|---|---|---|---|
| Suspended $H_2O$, p.p.m. | 18 | 33 | 34 | 39 | 45 | 48 | 49 | 65 | 76 | 88 |
| Test Result | Negative | Just Positive | Just Positive | Just Positive | Just Positive | Just Positive | Just Positive | Strong Positive | Strong Positive | Strong Positive |

Run No. 1 was clearly negative. The runs 2-8 were borderline positive of slightly increasing intensity. Runs 9-11 were definitely above the threshold level.

It is seen that the test apparatus and procedure, while giving very accurate and reproducible results not previously obtainable, is simple and can readily be provided in a simple portable kit. The vials are previously prepared with the dye incorporated therein but bearing caps without test paper merely to seal the vials. Separate empty vials have the test caps attached thereto, to keep the treated papers in dry condition ready for use. When a test is made, the test cap is taken from an empty container and used on a test vial after the fuel and oil-soluble wetting agent have been added thereto. It is possible, where conditions are dry, to keep the caps with the treated test paper in a separate container free of moisture so that extra vials can be dispensed with. The test is completed in about two minutes with a minimum of trouble and a maximum of reproducibility.

While the invention has been illustrated hereinabove in connection with a particular apparatus combination, it is understood that the invention applies broadly to alternate forms of apparatus and to alternate materials which fall within the scope of the invention. The only

I claim:

1. The method of determining the presence of undesirable amounts of water of the order of about 40 parts per million or more in distillate fuels comprising placing a measured quantity of the test fuel in an enclosed test zone, adding a small amount of an oil-soluble wetting agent to the fuel sample, adding a small amount of water-soluble dye to the fuel sample, treating a white, unsized paper with a water-soluble wetting agent and drying the paper before use, vigorously agitating the fuel sample in the presence of the dry paper whereby the presence of water is indicated by the number and intensity of colored dots which appear on the unsized white paper when the fuel contains an excessive amount of suspended water.

2. Claim 1 further characterized in that the oil-soluble wetting agent is sodium naphthenate.

3. Claim 1 further characterized in that the water-soluble wetting agent is an alkylaryl polyether alcohol.

4. Claim 1 further characterized in that the water-soluble dye is gentian violet.

References Cited in the file of this patent

UNITED STATES PATENTS

| | | |
|---|---|---|
| 2,567,445 | Parker | Sept. 11, 1951 |
| 2,844,025 | Joyce et al. | July 22, 1958 |
| 2,968,940 | Feldman et al. | Jan. 24, 1961 |

OTHER REFERENCES

Analytical Chemistry, Vol. 27, No. 9, September 1955, pages 1401–1404. (Copy in Patent Office Library.)